United States Patent
Baudoin et al.

(12)

(10) Patent No.: US 11,802,511 B2
(45) Date of Patent: Oct. 31, 2023

(54) INTERNAL STRUCTURE FOR A TURBOMACHINE NACELLE

(71) Applicant: SAFRAN AIRCRAFT ENGINES, Paris (FR)

(72) Inventors: Laurent Louis Robert Baudoin, Moissy-Cramayel (FR); Norman Bruno André Jodet, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 17/629,523

(22) PCT Filed: Aug. 6, 2020

(86) PCT No.: PCT/FR2020/051441
§ 371 (c)(1),
(2) Date: Jan. 24, 2022

(87) PCT Pub. No.: WO2021/032918
PCT Pub. Date: Feb. 25, 2021

(65) Prior Publication Data
US 2022/0268212 A1  Aug. 25, 2022

(30) Foreign Application Priority Data

Aug. 16, 2019 (FR) .................................... 1909234

(51) Int. Cl.
| | | |
|---|---|---|
| *F02C 7/18* | (2006.01) | |
| *B64D 33/04* | (2006.01) | |
| *F02K 1/38* | (2006.01) | |

(52) U.S. Cl.
CPC ............... *F02C 7/18* (2013.01); *B64D 33/04* (2013.01); *F02K 1/38* (2013.01); *F05D 2220/323* (2013.01); *F05D 2260/608* (2013.01)

(58) Field of Classification Search
CPC .......................... B64D 33/04; F05D 2260/608
See application file for complete search history.

(56) References Cited

U.S. PATENT DOCUMENTS 7,886,520 B2 * 2/2011 Stretton ................ F01D 17/105
239/265.17
8,096,105 B2 * 1/2012 Porte ........................ F02K 1/46
60/226.3
(Continued)

FOREIGN PATENT DOCUMENTS

FR           2966435 A1    4/2012

OTHER PUBLICATIONS

French Search Report issued in French Application FR1909234 dated Dec. 6, 2019 (2 pages).
(Continued)

*Primary Examiner* — Lorne E Meade
(74) *Attorney, Agent, or Firm* — Bookoff McAndrews, PLLC

(57) ABSTRACT

Internal structure for a turbomachine nacelle, the internal structure being intended to surround at least one part of a compartment capable of receiving a gas generator of the turbomachine, the internal structure comprising a ventilation cavity of said compartment, the ventilation cavity being provided with a main ventilation outlet and an auxiliary ventilation outlet separate to the main ventilation outlet, the internal structure comprising a shut-off member movable relative to the ventilation cavity between a flow position and a shut-off position in which the shut-off member shuts off the auxiliary ventilation outlet to a greater extent than in the flow position.

10 Claims, 3 Drawing Sheets

(56) References Cited

U.S. PATENT DOCUMENTS

| | | | | |
|---|---|---|---|---|
| 8,286,415 | B2 * | 10/2012 | Kohlenberg | ......... F01D 17/105 |
| | | | | 60/226.3 |
| 8,875,518 | B2 * | 11/2014 | Le Docte | ............... B64D 29/06 |
| | | | | 60/226.3 |
| 9,670,798 | B2 * | 6/2017 | Vauchel | ................ B64D 33/04 |
| 2007/0245739 | A1 | 10/2007 | Stretton et al. | |
| 2008/0271431 | A1 | 11/2008 | Porte | |
| 2010/0170220 | A1 | 7/2010 | Kohlenberg | |
| 2016/0047274 | A1 | 2/2016 | Woolworth et al. | |

OTHER PUBLICATIONS

International Search Report issued in International Application PCT/FR2020/051441 dated Sep. 17, 2020 with English Translation (4 pages).

\* cited by examiner

[Fig. 1]
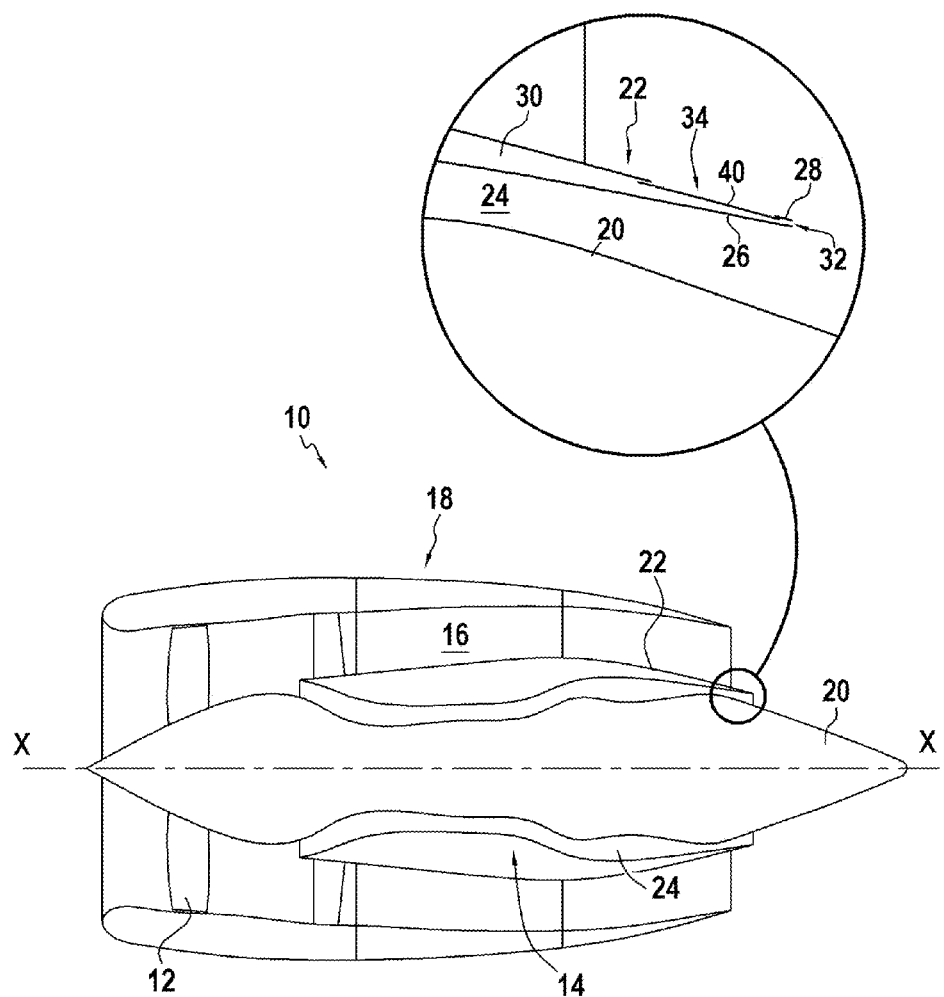

[Fig. 2]
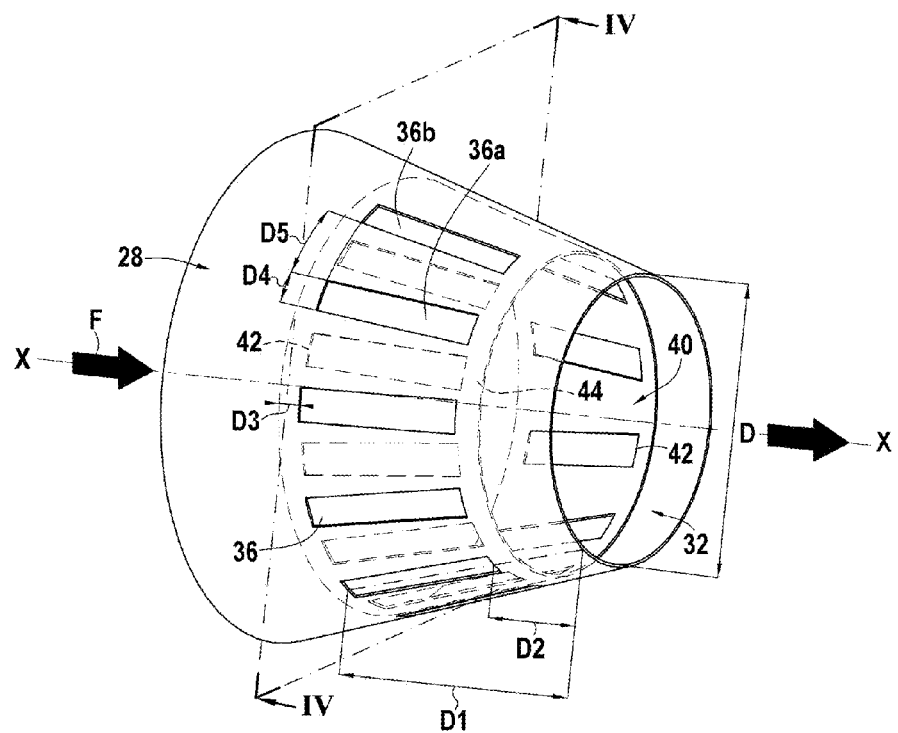
[Fig. 3]
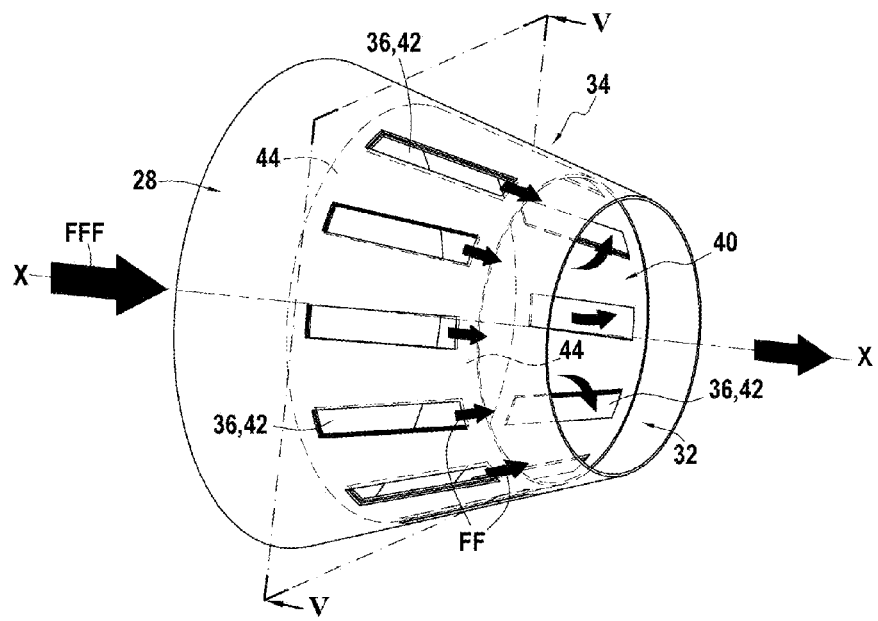

[Fig. 4]
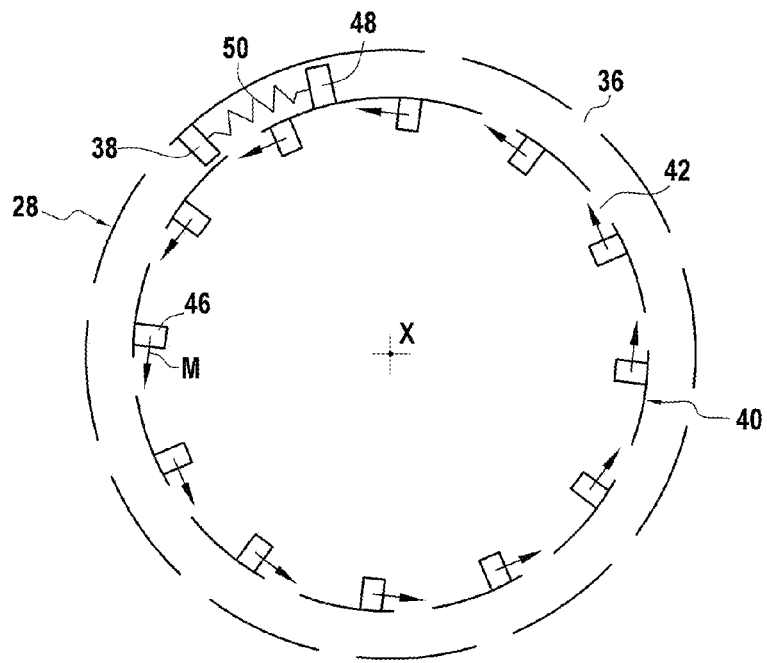
[Fig. 5]
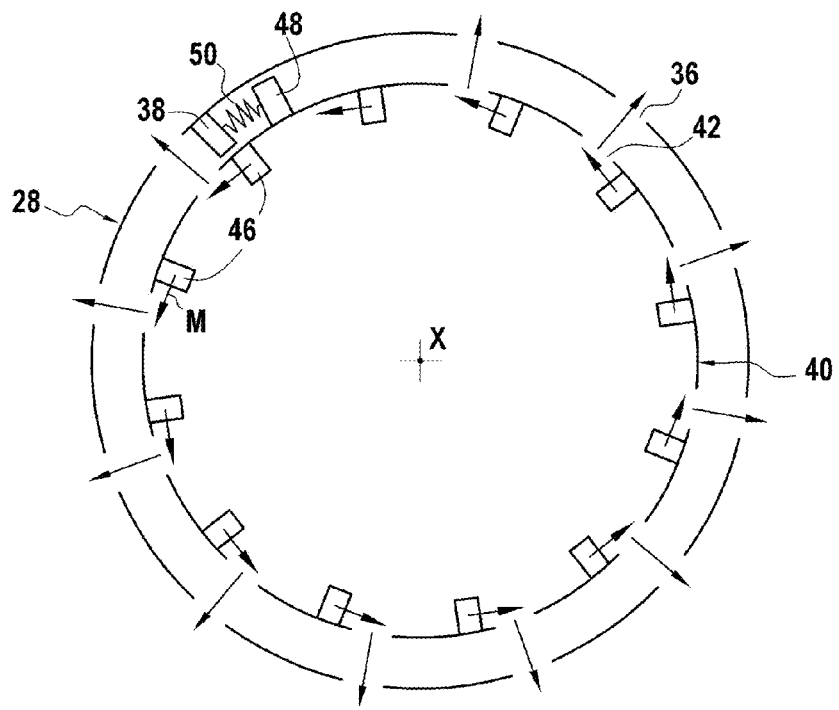

INTERNAL STRUCTURE FOR A TURBOMACHINE NACELLE

CROSS-REFERENCE TO RELATED APPLICATIONS

This patent application is the U.S. National Stage entry under 35 U.S.C. § 371 of International Patent Application No. PCT/FR2020/051441, filed on Aug. 6, 2020, which claims the benefit of priority to French Patent Application No. 1909234, filed on Aug. 16, 2019, the entirety of which is incorporated by reference herein.

TECHNICAL FIELD

The present summary relates to the field of turbomachine nacelles, mounted for example on aircraft, and more particularly a refinement made to an internal structure for turbomachine nacelle.

PRIOR ART

An aircraft turbomachine is generally mounted in a nacelle which ensures it is supported structurally at the same time as it contributes to auxiliary functions useful for operating the aircraft, for example a mechanical thrust reverser system.

Document FR 2 966 435 A1 discloses a nacelle of which the rear part exhibits an engine ventilation structure. This ventilation structure has a single annular outlet of which the cross-section is selectively shut off by a movable element so that it can be adapted at all rated speeds in flight to incidents likely to cause a variation in pressure in the ventilation structure.

Although such a nacelle is satisfactory, improvement in performance is a constant preoccupation in aeronautics. There is therefore a need for a novel type of internal structure for turbomachine nacelle.

DISCLOSURE OF THE INVENTION

For this purpose, the present summary relates to an internal structure for turbomachine nacelle, the internal structure being intended to surround at least one part of a compartment capable of receiving a gas generator of the turbomachine, the internal structure comprising a ventilation cavity of said compartment, the ventilation cavity being provided with a main ventilation outlet and an auxiliary ventilation outlet separate to the main ventilation outlet, the internal structure comprising a shut-off member movable relative to the ventilation cavity, between a flow position and a shut-off position in which the shut-off member shuts off the auxiliary ventilation outlet to a greater extent than in the flow position.

The compartment capable of receiving the gas generator of the turbomachine, also called core compartment, is provided to receive at least that part of the turbomachine which generates combustion gases the energy of which is then converted into mechanical energy intended to move the aircraft.

Thus, the internal structure can be annular and intended to be arranged around the core compartment and the gas generator.

The ventilation cavity can be formed between a cowl of the core compartment and a nozzle. The ventilation cavity can comprise orifices for ventilation air flow to and from the core compartment. In other terms, the ventilation cavity receives the circulation of a ventilation flow of the gas generator. For this reason, the flow circulating in the cavity is sometimes called "core vent".

The main ventilation outlet, or more simply main outlet, comprises one or more openings. Without loss of generality, one opening will be referred to from here on. The opening can be located such that in normal operating mode pressures lead the air to pass via the opening in a direction starting from the inside of the cavity towards the outside of the cavity. In other terms, the air of the ventilation cavity can exit via the opening in normal operation, preferably to be rejected outside the core compartment.

The auxiliary ventilation outlet, or more simply auxiliary outlet, comprises one or more holes. Without loss of generality, several holes will be referred to from here on. The holes can be located such that in normal operating mode the pressures lead the air to pass via the holes in a direction starting from the inside of the cavity towards the outside of the cavity. In other terms, apart from the shut-off member described hereinbelow, the air from the ventilation cavity can exit via these holes, preferably to be rejected outside the core compartment.

The shut-off member is provided to more or less shut off the auxiliary outlet so as to modulate its flow section. In this way, the auxiliary outlet has a first flow section when the shut-off member is in flow position, and a second flow section, reduced relative to the first flow section, when the shut-off member is in shut-off position. In this way, displacement of the shut-off member modifies the degree of blocking of the auxiliary outlet. The variation in flow section of the auxiliary outlet as a function of the position of the shut-off member adapts the air outlet flowrate of the ventilation cavity during different operating modes and potential incidents such as a pressurised pipe burst. It is understood that the cavity is devoid of internal hermetic separation between the main outlet and the auxiliary outlet: the main outlet and the auxiliary outlet terminate in the same flow space inside the cavity. In other terms, the flow which can exit via the main outlet enters the cavity via the same inlets as the flow which can exit via the auxiliary outlet.

Contrary to the devices of the prior art in which the single outlet was oversized to suit these different modes and cover the event of incidents, in the present summary, because the ventilation cavity has an auxiliary outlet separate to the main outlet and the flow section of which can be modulated, it is possible to optimise the sizing of the main outlet, without oversizing it. The result is a potentially reduced diameter of internal structure, therefore better compactness and a reduced mass as well as decreased drag. The performance of the nacelle is improved accordingly.

In the extreme, in the flow position, the shut-off member may not shut off the auxiliary outlet at all. Independently, in the extreme, in the shut-off position, the shut-off member may fully shut off the auxiliary outlet. Each of these characteristics enables to enlarge the position adjustment range of the shut-off member and therefore to gain in sizing freedom, precision and performance.

In some embodiments, the internal structure extends according to a longitudinal axis and the auxiliary ventilation outlet is offset, for example axially, radially and/or tangentially, relative to the main ventilation outlet. The auxiliary ventilation outlet may especially be upstream of the main ventilation outlet, for example in the event where said main outlet is at the downstream end of the ventilation cavity.

In some embodiments, the shut-off member is situated inside the ventilation cavity. In this way, the shut-off member is situated outside the core compartment and also outside the secondary vein which encloses the internal structure. In this way, the shut-off member does not disrupt the most important flows for aerodynamic performance of the turbomachine.

In some embodiments, the shut-off member comprises a band having windows and in the flow position said windows are at least partially facing the auxiliary ventilation outlet. In other terms, by more or less aligning the windows with the holes of the auxiliary outlet, the auxiliary outlet lets more or less ventilation flowrate through. The windows can be entirely confined inside the band, and/or be as cut-outs open onto an edge of the band. The band can be driven to slide. The band can be flat, annular or in the section of a ring, or any shape.

In some embodiments, the shut-off member is movable in rotation, for example around the axis of the turbomachine (axis of the core compartment).

In some embodiments, the internal structure comprises a control member configured to control the position of the shut-off member. The control member may be a passive member; a passive member can be driven automatically by a part of the turbomachine or of the nacelle or even by a flow which circulates therein, without voluntary energy supply. Alternatively or in addition, the control member may be an active member; an active member can utilise an actuator powered by a dedicated energy supply.

In some embodiments, the control member comprises at least one profiled element configured to drive the shut-off member towards the flow position in case of an increase in the ventilation flow in the ventilation cavity. The profiled element can be subjected to the ventilation flow in the ventilation cavity, or to a flow dependent on this ventilation flow, and the force exerted by this flow on the profiled element drives the shut-off member towards the flow position. Such embodiments are examples of a passive control member. In these embodiments, the control member adapts automatically to the flow in the ventilation cavity by blocking the auxiliary outlet less when a larger flow is circulating in the ventilation cavity.

In some embodiments, the control member comprises at least one return element configured to bias the shut-off member back towards the shut-off position. The shut-off position can constitute the rest position of the shut-off member.

In some embodiments, the auxiliary ventilation outlet is arranged to one side of the ventilation cavity opposite said compartment. In this way, the fact that the auxiliary outlet is more or less open does not disrupt cooling of the core compartment. The "opposite side" may extend especially in the radial direction of the turbomachine.

The present summary also relates to a turbomachine nacelle comprising an internal structure such as previously described.

BRIEF DESCRIPTION OF THE DRAWINGS

Other characteristics and advantages of the object of the present summary will emerge from the following description of embodiments given by way of non-limiting examples in reference to the appended Figures.

FIG. 1 is a longitudinal section of a turbomachine according to an embodiment.

FIG. 2 is a perspective diagram of an internal structure according to an embodiment, the shut-off member being in shut-off position.

FIG. 3 is a perspective diagram of an internal structure according to an embodiment, the shut-off member being in flow position.

FIG. 4 is a view in cross-section according to the plane IV-IV of FIG. 2.

FIG. 5 is a view in cross-section according to the plane V-V of FIG. 3.

DETAILED DESCRIPTION

The turbomachine 10 of longitudinal axis X-X shown in FIG. 1 is of the turbofan type. The longitudinal axis X-X defines an axial direction. A radial direction is a direction perpendicular to this axis and cutting this axis. Similarly, an axial plane is a plane containing the longitudinal axis X-X and a radial plane is a plane perpendicular to this axis. A circumference extends as a circle belonging to a radial plane and the centre of which belongs to the longitudinal axis X-X. A tangential or circumferential direction is a direction tangential to a circumference; it is perpendicular to the longitudinal axis X-X but does not pass through the axis.

As is well known per se, the turbomachine 10 comprises among others a fan 12 which is driven by a gas generator 14 and an annular fan duct 16 delimited externally by a nacelle 18.

The turbomachine 10 also comprises a central annular body 20 centred on the longitudinal axis X-X. Also, the nacelle 18 comprises an internal structure 22, here annular, enclosing at least in part the compartment receiving the gas generator 14 (core compartment). More precisely, the internal structure 22 is arranged coaxially around the central body 20 so as to delimit with the latter a primary annular duct 24 for the flow of a gas flow from the gas generator 14. Thus, the internal structure extends axially according to the longitudinal axis X-X.

As illustrated in the detail of FIG. 1, the internal structure 22 comprises a radially internal cowl 26 and a radially external nozzle 28. The cowl 26 and the nozzle 28 together form a ventilation cavity 30 in which a ventilation flow of the core compartment circulates. The nozzle 28 is provided radially inside the annular fan duct 16 and therefore differs from the nozzle of the nacelle 18 proper. Also, as illustrated, the ventilation cavity 30 differs from the annular fan duct 16 and the primary annular duct 24.

As is known per se, the ventilation cavity 30 is provided with a main ventilation outlet 32 for the discharge of said ventilation flow to downstream of the turbomachine 10. The main outlet 32 is here formed by a space separating the cowl 26 from the nozzle 28 at their downstream end. The flow exiting from the main outlet 32 is directed by the nozzle 28. In this embodiment, the main outlet 32 comprises a single opening, here annular and coaxial to the central body 20. The main outlet 32 here defines a plane, in this case radial, called ejection plane of the nozzle 28.

As pointed out earlier, the ventilation cavity 30 also has an auxiliary ventilation outlet 34, also seen in FIG. 2. FIG. 2 illustrates, in perspective and without respect to scale, the nozzle 28 and the main 32 and auxiliary 34 ventilation outlets. For reasons of clarity, the cowl 26, the central body 20 and other elements of the internal structure 22 are not illustrated in FIG. 2.

It is clear from the outset that in this embodiment the auxiliary outlet 34 is provided in the nozzle 28 and not in the cowl 26; in other terms, the auxiliary outlet 34 is arranged to one side of the ventilation cavity 30 opposite the core compartment. But as a variant the auxiliary outlet 34 could be provided at another place on the ventilation cavity 30, typically in the cowl 26.

In this embodiment, the auxiliary ventilation outlet 34 comprises a plurality of holes 36. The holes 36 can be distributed over the nozzle 28, for example in the circumferential direction, regularly or irregularly. The holes can have any shape, for example rectangular as illustrated, or again polygonal, circular, elliptical, oval, oblong, etc. For example, a rectangular or oblong shape allows cost-efficient implementation.

The upstream end of the holes 36 can be situated axially at a distance D1 from the ejection plane of the nozzle 28, the distance D1 being at least equal to a fifth of the diameter D of the main outlet 32. In this way, the holes 36 can be long enough for the auxiliary outlet 34 to have a significant impact on the flow exiting from the ventilation cavity 30. The distance D1 is typically of the order of 60 millimetres (mm), more generally between 30 and 90 mm.

The downstream end of the holes 36 can be situated axially at a distance D2 from the ejection plane of the nozzle 28, the distance D2 being more than or equal to 2 mm, preferably more than or equal to 5 mm, more preferably more than or equal to 10 mm. In this way, the rigidity of the nozzle in its downstream part is retained despite the presence of the holes 36.

In this way, the holes 36 can extend over several centimetres, or even tens of centimetres in the longitudinal direction X-X. As a variant, a grid of holes of relatively small dimensions (for example under 5 centimetres, or even 2 centimetres, or more still 1 centimetre) has advantages over the aerodynamic and acoustic aspects, and can still be achieved by known processes and at reasonable cost. In the case of a grid of relatively small holes 36, or more generally in the event where some holes 36 are axially offset relative to each other, the previous considerations apply to the holes 36 farthest upstream and farthest downstream respectively.

It emerges from the above and FIG. 2 that the auxiliary ventilation outlet 34 is axially offset relative to the main ventilation outlet 32. In this case, the holes 36 are upstream of the main outlet 32, the main outlet 32 being provided at the downstream end of the nozzle 28.

Also, the internal structure 22 comprises an shut-off member 40. The shut-off member 40 is mounted movable relative to the ventilation cavity 30. In this embodiment, the shut-off member 40 comprises a band, here configured as a ring. The band has one or more windows 42, in this case a plurality of windows 42. The windows 42 may be distributed circumferentially over the band, regularly or not. The windows 42 are intended to be positioned opposite the holes 36 so as to create an air flow in the auxiliary outlet 34; in this respect the windows 42 may have a shape, a size and/or an arrangement corresponding to those of the holes 36, as illustrated in FIG. 3 described hereinbelow. However, this is not necessary and the windows 42 might have a shape, a size or an arrangement different to that of the holes 36, as soon as the at least partial superposition of the holes 36 and the windows 42 is enough to create said air flow, according to a sizing within reach of the skilled person.

The windows 42 may be enclosed at least on one side axially (direction transverse to the displacement of the shut-off member 40), and preferably axially on either side, by margins 44 devoid of openings. The margins 44 can boost the rigidity of the shut-off member 40 and limit leaks. For example, the margins 44 can extend axially over a distance D3 of more than or equal to 2 mm, preferably to 5 mm, more preferably to 10 mm.

In FIG. 2, the shut-off member 40 is shown in shut-off position. In this case, the shut-off member 40 fully shuts off the auxiliary outlet 34, apart from inevitable leaks. Such leaks can be reduced, if necessary, by means of sealing joints, for example brushes or flexible tabs or more generally any sealing means tolerating the movement of the shut-off member 40 relative to the ventilation cavity 30. These sealing joints can be provided for example on the periphery of the holes 36 and/or the windows 42.

It is noteworthy that, along the circumferential direction (direction of displacement of the shut-off member 40), the width D4 of a given hole 36a is less than the distance D5 between this hole 36a and at least one adjacent hole 36b. In this way, the window 42 corresponding to the hole 36a can be fully offset to said hole 36a and the shut-off member 40 can fully block said hole 36a.

In the present embodiment, the shut-off member is situated inside the ventilation cavity 30, therefore in this case radially inside the nozzle 28. For example, the flow section of the shut-off member 40, apart from the windows 42, can be reduced by 0.1% to 5% relative to the flow section of the nozzle 28 so that it can house the shut-off member 40 radially inside the nozzle 28.

Typically, the play provided between the radially external surface of the shut-off member 40 and the internal surface of the nozzle 28 can be under 5 mm, preferably less than 2 mm, more preferably less than 1 mm, e.g. for sealing reasons.

Also, the shut-off member 40 can be movable in rotation relative to the ventilation cavity 30 and here relative to the nozzle 28. The internal structure 22 may be provided with any adapted system, e.g. elements known per se and not shown here such as grooves, stops, fins, etc., to ensure the pivot link between the shut-off member 40 and the rest of the internal structure 22. According to an example these systems or elements may be provided on the complementary surfaces of the nozzle 28 and/or of the shut-off member 40.

As pointed out earlier, the shut-off member 40 is configured to shift from the shut-off position, an example of which is illustrated in FIG. 2, to the flow position an example of which is illustrated in FIG. 3. In this embodiment, the movement between the shut-off position and the flow position can be performed by rotation of the shut-off member 40, here around the longitudinal direction X-X, otherwise expressed in the circumferential direction. The shifting of the shut-off member 40 in the flow position can be done when the ventilation cavity 30 receives increased ventilation flow FFF (FIG. 3). The increased ventilation flow is above a certain threshold, and in particular more than the nominal ventilation flow F (FIG. 2) provided for normal operation of the turbomachine.

In the flow position, the shut-off member 40 shuts off the auxiliary ventilation outlet 34 to a lesser extent than in the shut-off position. In this case, as illustrated in FIG. 3, in the flow position the shut-off member 40 does not shut off the auxiliary outlet 34 at all. This may be achieved for example by putting the windows 42 partially or fully facing the auxiliary outlet 34, and more particularly the holes 36. In this way, as illustrated in FIG. 3, the excess ventilation flow FF can be discharged via the auxiliary outlet 34, while the main outlet 32 can remain sized for its nominal outlet flowrate.

The position of the shut-off member 40, and especially the shifting of the shut-off member 40 between the shut-off position and the flow position, may be controlled by means of an active or passive control member. FIGS. 4 and 5 schematically illustrate the implementation of a passive control member according to an embodiment.

In this example, the control member comprises at least one profiled element 46 configured to drive the shut-off member 40 towards the flow position in case of an increase in the ventilation flow in the ventilation cavity 30. A profiled element may be an element having an aerodynamic profile (for example a non-zero camber) configured to generate lift. In this case, the control member comprises a plurality of profiled elements 46, specifically here bladings or fins, attached to the shut-off member 40, at least in the direction of displacement of the latter between the shut-off position and the flow position. In this embodiment, the profiled elements 46 receive the ventilation flow F. The resulting lift causes displacement M transverse to the ventilation flow, in this case in the circumferential direction, this displacement tending to bring the shut-off member 40 to its flow position.

Besides, the control member may comprise at least one return element 50 configured to bias the shut-off member 40 back towards the shut-off position. The return element 50 may be a spring, as illustrated, a tank with variable volume of compressible fluid, an elastic element, a pair of magnets, or any other element capable of exerting a return force. In this case, the return element 50 has a fixed part attached to the nozzle 28 (or to another fixed part of the internal structure 22), here via a stop 38, and a movable part attached to the shut-off member 40, here via a stop 48. The return element 50, here the mounted compressive spring, tends to guide the shut-off member 40 back towards the shut-off position.

In this way, in this embodiment the control member comprises two competing elements tending to draw the shut-off member 40 either to its shut-off position or to its flow position. These elements, specifically the return element 50 and the profiled element 46 respectively, can be sized such that the equilibrium between the two is a function of the ventilation flow in the ventilation cavity 30. In this way, in this example when the nominal ventilation flow F or a lesser flow is circulating in the ventilation cavity 30, this flow is not enough to drive the profiled elements 46 in rotation against the return force of the compressive spring, such that the shut-off member 40 stays in its shut-off position shown in FIG. 4.

Inversely, when the ventilation flow (increased ventilation flow) FFF exceeds a threshold value, this flow becomes sufficient to drive the profiled elements 46 against the return force of the return element 50 and the shut-off member 40 moves to its flow position shown in FIG. 5. It follows that the shut-off member 40 shuts off the auxiliary outlet 34, especially the holes 36, to a lesser extent, which allows the excess of the ventilation flow FF to exit from the ventilation cavity 30 via the auxiliary outlet 34. As can be seen in FIG. 5, by coming against each other (apart from the minimal length of the return element 50, if appropriate) the respective stops 38, 48 of the nozzle 28 and the shut-off member 40 enable good relative positioning of the holes 36 and the windows 42.

The control member presented in this way therefore achieves subordination of the position of the shut-off member 40 over the intensity of the ventilation flow before escaping from the ventilation cavity 30. Also, this embodiment enables continuous adjustment of the position of the shut-off member 40 as a function of the ventilation flow to be discharged.

In other embodiments, the position of the shut-off member 40 could be adjusted discretely, the shut-off member 40 assuming a predefined number of identified positions.

Other types of control members are possible, for example active control members such as an actuator, for example of jack type, configured to drive the shut-off member 40 in rotation. The actuator can be subordinated to a pressure sensor in the ventilation cavity 30.

A common factor of the control members previously described is being reversible, that is, they allow the shut-off member 40 to shift from the shut-off position to the flow position and vice versa. To the extent where the auxiliary outlet 34 is provided essentially for accidental points of operations, non-reversible control members can be provided, for example a return element configured to return the shut-off member 40 to its flow position, the shut-off member 40 also being kept in the shut-off position by way of a frangible element configured to break in case of a rise in pressure in the ventilation cavity 30 above a specific threshold.

Although the present presentation has been described in reference to a specific embodiment, it is evident that various modifications and changes can be made to these examples without departing from the general scope of the invention such as defined by the claims. For example, in place of a band configured as a ring, the shut-off member 40 can comprise one or more individual strips capable of blocking the holes 36 more or less. The strips can slide independently of each other, for example substantially axially along the holes 36 to block them off. The auxiliary outlet 34 and the shut-off member 40 can have any shape, size or arrangement provided the shut-off member shuts off the auxiliary ventilation outlet in the shut-off position to a greater extent than in the flow position.

Also, the directions presented hereinabove can of course be adapted in case of change in orientation and direction of displacement of the shut-off member.

According to another example, even though the shut-off position and the flow position have been described in the event where they offer 0% and 100% respectively of the flow section of the auxiliary outlet 34, it is possible to size the shut-off member 40, the auxiliary outlet 34 and/or the control member such that the shut-off position and/or the flow position offers an intermediate flow section of the auxiliary outlet 34, as long as the shut-off member 40 shuts off the auxiliary ventilation outlet 34 in the shut-off position to a greater extent than in the flow position.

Also, even though the present explanation has been detailed within the scope of an aircraft turbofan, the internal structure 22 described can apply to other types of turbomachines and nacelles.

More generally, individual characteristics of the various abovementioned embodiments can be combined in additional embodiments. As a consequence, the description and the drawings must be considered in an illustrative rather than a restrictive sense.

The invention claimed is:

1. An internal structure for a nacelle of a turbomachine, the internal structure surrounding at least one part of a compartment capable of receiving a gas generator of the turbomachine, the internal structure comprising:
   a ventilation cavity of said compartment, the ventilation cavity being provided with a main ventilation outlet and an auxiliary ventilation outlet separate from the main ventilation outlet, the ventilation cavity being devoid of internal hermetic separation between the main ventilation outlet and the auxiliary ventilation outlet, the internal structure further comprising a shut-off member comprising a band having windows, the shut-off member being movable, relative to the ventilation cavity, between a flow position in which said windows are at least partially facing the auxiliary ventilation outlet, and a shut-off position in which the shut-off member shuts off the auxiliary ventilation outlet to a greater extent than in the flow position.

2. The internal structure according to claim 1, wherein the internal structure extends according to a longitudinal axis and the auxiliary ventilation outlet is axially offset relative to the main ventilation outlet.

3. The internal structure according to claim 1, wherein the shut-off member is situated inside the ventilation cavity.

4. The internal structure according to claim 1, wherein the shut-off member is movable in rotation.

5. The internal structure according to claim 1, further comprising a control member that includes at least one profiled element having blading or fins and at least one return element that includes a spring, and wherein the control member is configured to control the position of the shut-off member.

6. The internal structure according to claim 5, wherein the at least one profiled element is attached to the shut-off member configured to drive the shut-off member towards the flow position in case of a ventilation flow increase in the ventilation cavity.

7. The internal structure according to claim 5, wherein the at least one return element includes a movable part attached to the shut-off member by a stop configured to bias the shut-off member back towards the shut-off position.

8. The internal structure according to claim 1, wherein the auxiliary ventilation outlet is arranged to one side of the ventilation cavity opposite said compartment.

9. A turbomachine nacelle comprising an internal structure according to claim 1.

10. An internal structure for a nacelle of a turbomachine, the internal structure surrounding at least one part of a compartment capable of receiving a gas generator of the turbomachine, the internal structure comprising:

a ventilation cavity of said compartment, the ventilation cavity being provided with a main ventilation outlet and an auxiliary ventilation outlet separate from the main ventilation outlet, the internal structure further comprising a shut-off member comprising a band having windows, the shut-off member being movable, relative to the ventilation cavity, between a flow position in which said windows are at least partially facing the auxiliary ventilation outlet, and a shut-off position in which the shut-off member shuts off the auxiliary ventilation outlet to a greater extent than in the flow position, wherein the internal structure further comprises a control member that includes at least one profiled element having blading or fins and at least one return element that includes a spring, and wherein the control member is configured to control the position of the shut-off member.

\* \* \* \* \*